Nov. 17, 1936.　　　　H. BATES　　　　2,061,342

TOY TYPEWRITER

Filed July 14, 1934　　　3 Sheets-Sheet 1

Harry Bates
INVENTOR

BY
ATTORNEY

Nov. 17, 1936.   H. BATES   2,061,342
TOY TYPEWRITER
Filed July 14, 1934   3 Sheets-Sheet 2
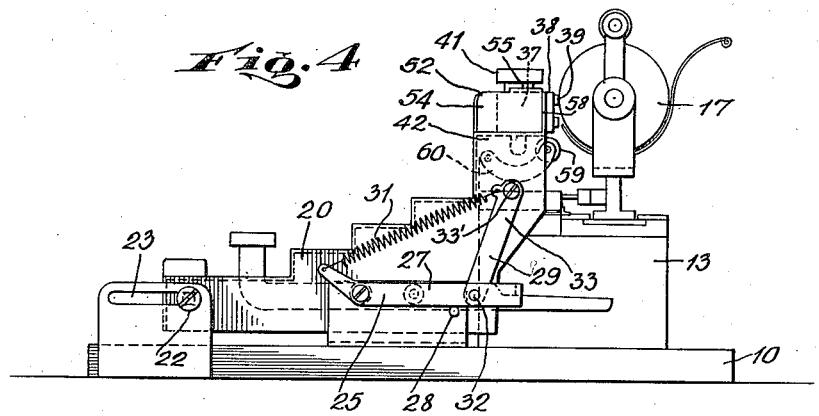
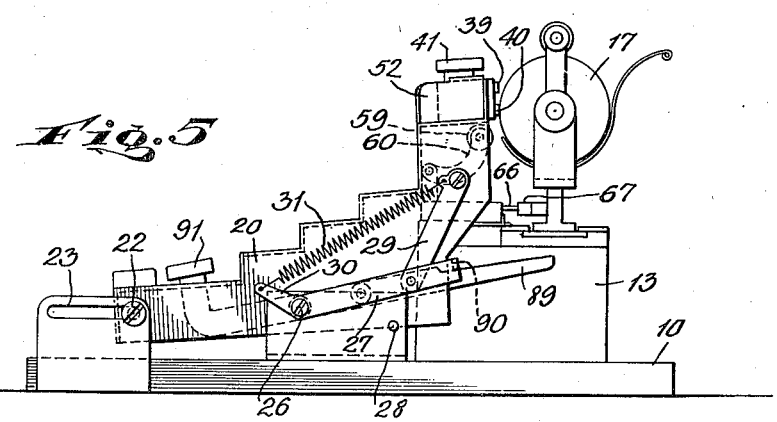
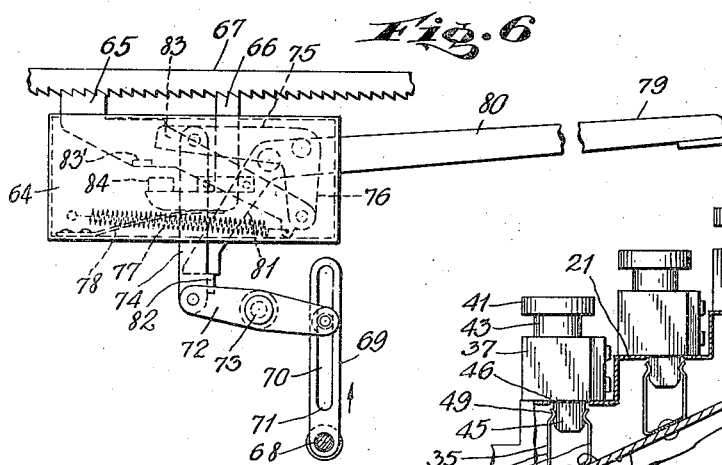
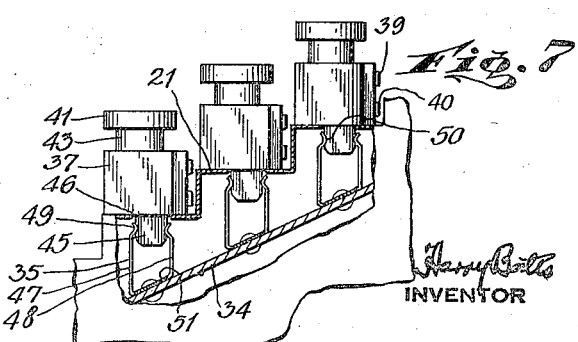

Nov. 17, 1936.  H. BATES  2,061,342
TOY TYPEWRITER
Filed July 14, 1934  3 Sheets-Sheet 3
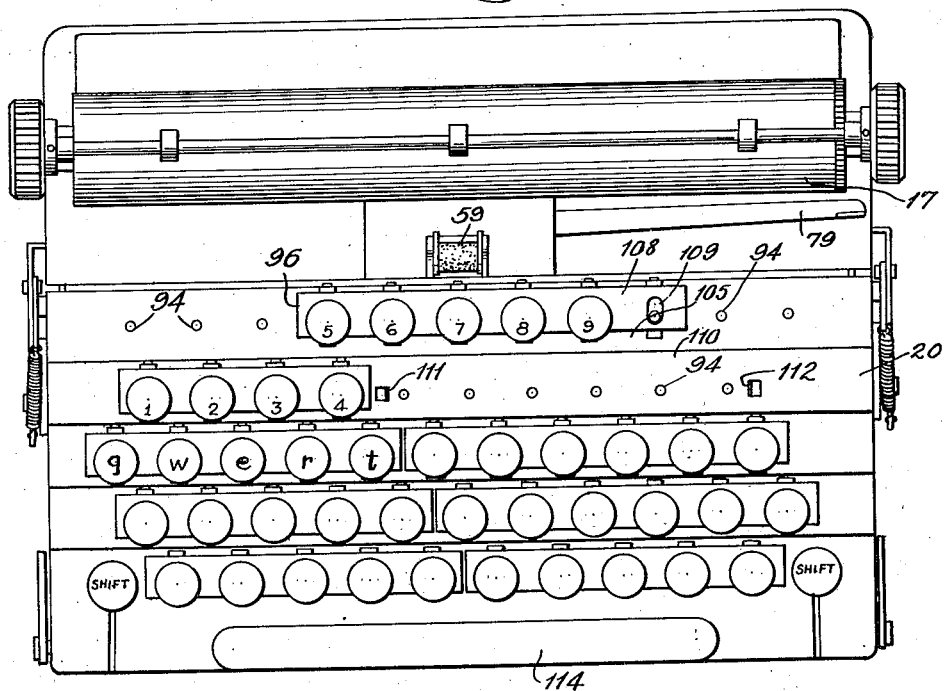
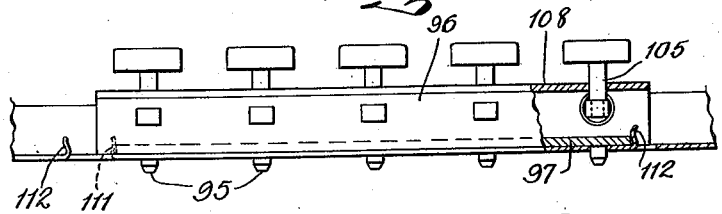
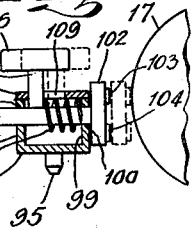
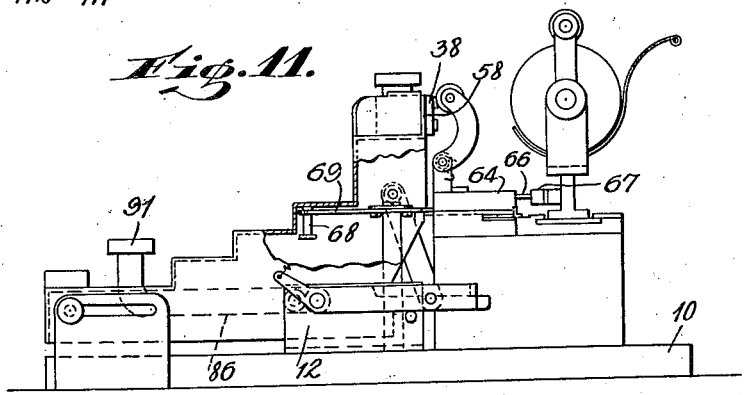

Patented Nov. 17, 1936

2,061,342

UNITED STATES PATENT OFFICE 2,061,342

TOY TYPEWRITER

Harry Bates, New York, N. Y., assignor to Bates Laboratories, Inc., New York, N. Y., a corporation of New York Application July 14, 1934, Serial No. 735,107

21 Claims. (Cl. 197—1)

The present invention is directed to a toy typewriter having a new principle of operation. More particularly the invention is concerned with a novel typewriter utilized as an educational toy which will work with rapidity, accuracy and ease. Broadly speaking, one object of the invention is to provide an educational toy closely simulating a standard typewriter having a reciprocable keyboard adapted to be bodily shifted towards and away from a cooperative platen. Specifically, another object is to provide, in a toy typewriter of the type referred to, a reciprocable but tiltable keyboard adapted to be bodily raised for printing capital letters upon the manipulation of a shift key lever. A further and more specific object resides in the provision of a bodily shiftable keyboard removably supporting a plurality of indicia identified type carrying blocks simulating keys. As a further object the invention comprehends the provision of means for removably housing and guiding a type carrying block before a disappearing inker contracted and actuated by a selected block during displacement of the keyboard towards the platen. More particularly, another object of the invention is to provide a reciprocable keyboard having means for automatically shifting the platen a predetermined distance laterally on each cycle of operation of the keyboard.

A still further object of the invention is to provide an attractive educational toy characterized by having block means conveniently employed to teach elementary facts and easily utilized in printing characters against a step by step rotatable platen of a relatively light weight portable devise simulating in appearance a standard keyboard.

Another aspect and further advantage of the invention is the provision of a slidable keyboard adapted to be manually moved towards a platen and automatically retracted therefrom pursuant to the printing operation.

More specifically, a further object of the invention is to provide a novel reciprocable self retracting stepped keyboard having displaceable means bodily carrying a plurality of indicia identified type sustaining members simulating keys, the keyboard being so constituted as to removably receive a selected member of the plurality before a swingable but self righting inker, each member having actuating means for driving the type thereof against the inker and for displacing the keyboard towards the platen and dispose the ink coated type of a selected member thereagainst.

The novel features characterizing the invention are set forth with particularity in the appended claims. However, it is to be understood, that the invention both as to its organization and its method of operation, together with the objects, features and advantages thereof will be best understood from the the following description of several specific embodiments when read in connection with the accompanying drawings in which Fig. 1 is a plan view of my toy typewriter according to one form of the invention.

Fig. 4 is a view similar to Fig. 2 but illustrating the reciprocable keyboard body against the platen for the printing operation.

Fig. 5 is a view similar to Fig. 4 showing the reciprocable keyboard tilted to print capital letters.

Fig. 6 is a fragmentary and enlarged view of an escapement device for advancing the platen carriage step by step pursuant to each printing operation.

Fig. 7 is a fragmentary view of the keyboard particularly illustrating individual spring means for removably sustaining an indicia and type carrying block.

Fig. 8 is a plan view of another form of toy typewriter.

Fig. 9 is a view in elevation of a fragmentary portion of the keyboard shown in Fig. 8, exemplifying a unitary bank or panel of members simulating key carried by the keyboard.

Fig. 10 is a transverse section of Fig. 9, showing two positions of the type carrying means, one, in the non-printing position shown in the full lines, and the other in the printing position shown in dotted lines and Fig. 11 is a side view of Fig. 8 in elevation and partly in section.

Figure 1:
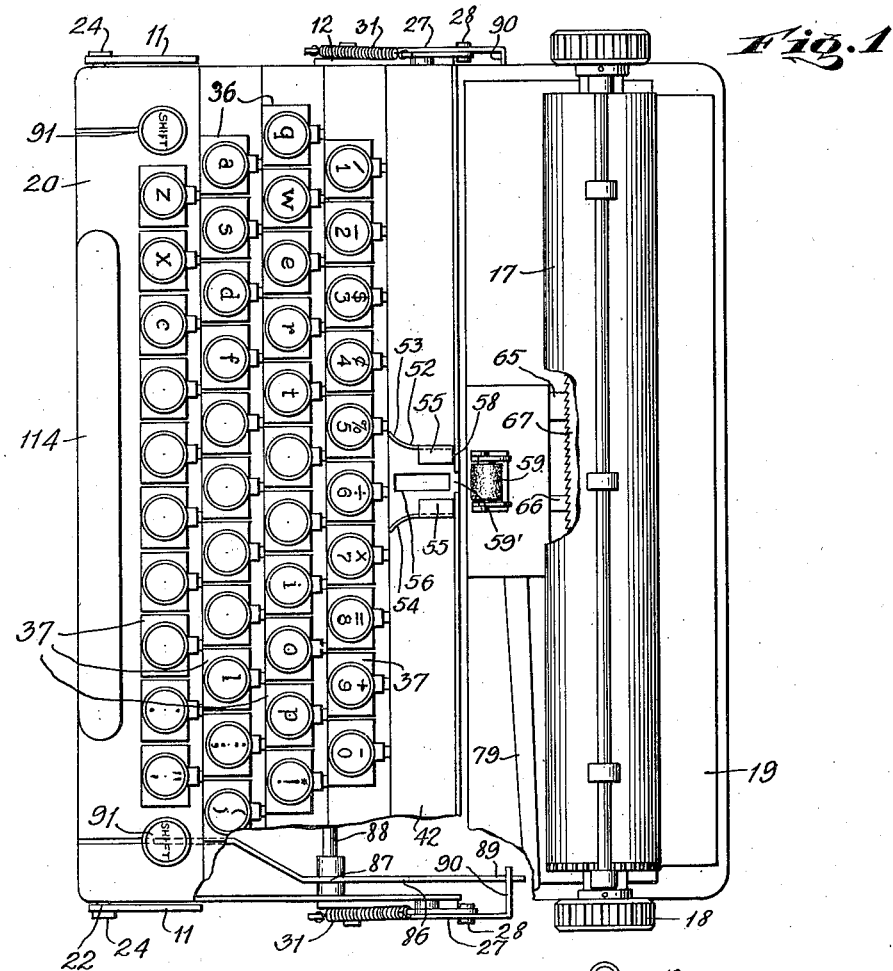

According to the invention, the toy typewriter comprises a rectangular base plate or pedestal 10 carrying spaced upstanding plates 11 and 12 at each side thereof. These plates each extend above the elevation of the base plate and may be rigidly secured thereto in any well known fashion.

Appropriately fastened at and to the rear end of the base plate is a carriage support or platform 13 extending longitudinally thereof and comprising a longitudinally disposed guide channel or track 14 in which an inverted T shaped foot 15 of the platen carriage, generally designated 16, is rectilinearly directed.

Rotatably mounted on the carriage 16 and bodily movable therewith is a cylindrical platen 17. Knurled manipulating wheels as 18 extending beyond the sides of the carriage are so associated with the platen, that upon rotation of wheels 18, platen 17 may be rotated about its longitudinal axis in step by step fashion by any suitable means well known in the art. The carriage is also provided with a reflexed shield 19 for guiding a sheet of paper or the like when drawn about the front face of the platen.

A reciprocable keyboard, generally denoted 20, is displaceable relative to the platen. Keyboard 20 in the form of a hollow casing having its upper face presenting a plurality of steps as 21. Fixedly secured to each of the sides of the casing at each of the front ends thereof is a laterally extending pin or post 22 each of which is rectilinearly and slidably guided in an elongated slot 23 of a contiguous plate as 11. To prevent lateral displacement of the stepped casing in respect to spaced guide plates 11, each post 22 includes an enlarged head 24 overhanging the outer face of a cooperative guide plate.

Attached to each outside face of the spaced plates or brackets 12 is a bell crank lever 25 each of which has its intermediate portion appropriately and pivotally attached to the shank of a respective bolt or set screw 26 secured to an associated guide plate 12. The longer arm 27 of each pivoted bell crank normally rests on a fixed stud or projection as 28 extending laterally of and secured to each guide plate 12.

Pivotally mounted on each side wall of the casing 20 is a link 29 which has its lower end pivotally connected to an associated long arm 27 of a respective bell crank lever 25, the shorter arm 30 of the latter and the upper pivoted terminal portion of a cooperating link 29 are interconnected by a helicoidal spring 31.

Figure 2:
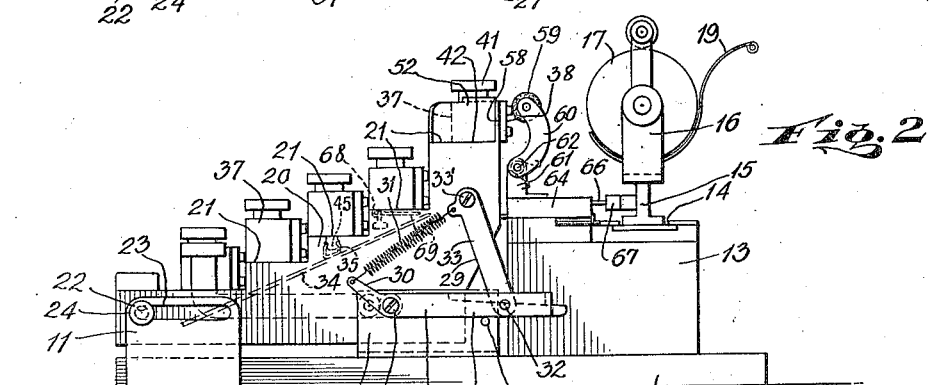
Fig. 2 is a side view of Fig. 1, showing the stepped reciprocable keyboard retracted.

With the present construction, it is thus apparent that the hollow casing 20 has its forward end slidably guided on the spaced stationary plates 11 by reason of the protruding posts 22 arranged with slots 23 and has its rear end pivotally suspended on the spaced pivoted links 29. It follows therefore, that if, the casing is moved towards the platen, the casing will be bodily displaced in a substantially rectilinear direction, the displacement of the casing towards the platen being limited the length of the guide slots 23. Thus, in Fig. 2, the casing is in a normally retracted position. In Fig. 4, however, the casing has been displaced to the right and is shown in its other extreme position, to wit, in close proximity to the platen for effecting the printing operation.

In moving towards the platen, the casing shifts the upper pivoted portions 33 of links 29. The lower portions of these links, however, merely swing about the fulcrum posts 32 carried by arms 27 of bell crank levers 25, the upper portions of the links 29 being pivotally sustained on shanks of set screws 33' fastened to the side walls of the casing. Consequently, the distance between the upper terminals of associated shorts arms 30 and links 29 is increased when the casing is moved towards the platen. It follows that the helicoidal springs 31 are progressively distended. The energy stored up in these springs is taken advantage of to automatically retract the casing or keyboard. In other words, after the casing has been manually displaced towards the platen, it is self retracing due to the release of the springs 31. It should be noted that the weight of the rear portion of the casing is taken up by the spaced posts 28, the latter serving in fact as stops or abutments to support the load sustained by long arms of the bell crank levers 25.

Spaced from the stepped portion of the casing and appropriately carried by the latter longitudinally thereof is an inclined plate 34 to which is secured a plurality of rows of U shaped springs 35, there being a row of springs for each row of indicia and type carrying blocks, generally designated 36, (see Figs. 1 and 7). Although only four rows of blocks are illustrated, the invention it is to be understood, is not limited to this number.

Figure 3:
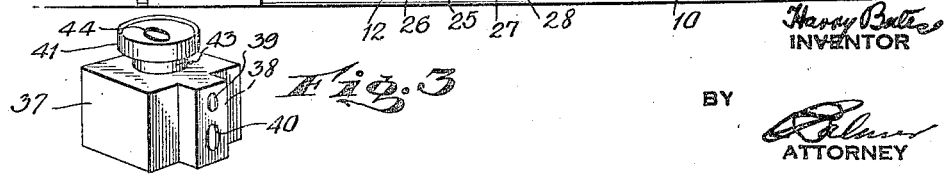
Fig. 3 is a perspective view of one of the indicia identifying type carrying blocks which is removably sustained on the reciprocable keyboard.

In the form according to Figs. 1, 2, 3, 4 and 7 each block 37 of a row is in the form of a rectangular parallelepiped having an integrally connected rear bar or rib 38 coextensive with the vertical height of the block and provided with a rear flat face carrying spaced type as 39 and 40 in relief. In Fig. 3, type 39 designates the small letter "o" and 40 identifies the capital letter "O". According to the present invention, the upper type of the several blocks is for the small letters of the alphabet and the lower type is for the capital letters. Of course, the blocks may carry type to print other symbols, such as numbers, educational designs, punctuation marks, etc. In other words, the several rows of blocks carry the required type as in the case of a standard keyboard and each block or key 37 is provided with a manipulating head 41 in the form of a disc having a depending shank 43 which is fixedly secured to the body of a respective block, each head of the several blocks carry exposed indicia as 44 to identify the type carried thereby.

Each block 37 is also provided with a depending circular post or stud 45 to be removably projected through openings as 46 in the horizontal portions of the several steps as 21 (see Fig. 7). Upstanding arms 47 and 48 of a spring 35 each embody free inwardly offset lip portions or detents 49 and these cooperate with grooves or indentations 50 of an associated stud 45 whereby the latter may be readily locked by the resilient arms of a respective spring, the common intermediate connecting portions such as 51 of the arms of a spring 35 is rigidly fastened to the inclined plate 34. It follows therefore, that the indicia and type carrying key or block members may be conveniently and selectively removed from the stepped casing or keyboard 20.

The upper step 42 of keyboard comprises a housing, broadly denoted 52, for the reception of a single type carrying block 37. This housing embodies spaced and vertically disposed upstanding panels 53 and 54 each of which is secured to the horizontal wall of the upper step, the forward ends of the panels being flared forming a relatively large throat or entrance to facilitate the insertion of a block within the housing, the rear portion of the panels are spaced apart a distance slightly greater than a block to prevent lateral displacement of the latter. The cooperating panels 53 and 54 are each provided at either upper ends with an inwardly extending guide lug as 55 forming a gap through which a post 43 of a block may be displaced. The bottom wall of the housing which is a part of the horizontal wall of the upper step is provided with an elongated slot 56 adapted to removably receive and guide a depending stud 45 of a block.

In Fig. 1 the blocks of the several rows are in their locked or non-printing positions and the block receiving housing is unoccupied. If for example, it is desired to print, say the small letter "c", the operator grasps the headed block designated "c" disposed in the front row and manually raises it, thus its stud 45 becomes disconnected. The operator then places the removed or selected block into housing 52 between the side panels 53 and 54, the depending stud of this block will therefore enter into the elongated slot 56 and its disc head or manipulating portion will be slightly above and overhanging the guide lugs 55.

Having properly placed a selected block in the housing, an operation which may be quickly made, the operator grasps the head of the block within the housing and exerts a slight finger pressure in a direction towards the platen, this block will then be slidably moved to the rear end of the housing, being guided in its movement, as is well understood. Reaching the rear vertical wall 58 of the housing, the type carrying rib or bar 38 of the block passes into a correspondingly shaped vertically disposed opening 59' of the rear wall 58 and overhangs the same such that the small case type as 39 of the block comes in contact with an ink moistened pad or roller 59 rotatably carried by a swingable or disappearing inker 60 having its lower end pivotally carried by a stationary bracket 61 supported on the platform 13. Stated in another way, a block may be quickly removed from the keyboard and conveniently arranged within the housing in such fashion that its type may be coated with the required amount of ink before being brought against the platen.

Further finger pressure in the same direction on the manipulating head of the selected block disposed within the housing, now causes the keyboard to slidably move bodily towards the platen 17 due to the pressure of the rear face of the block against the rear wall of the housing. With the keyboard moving towards the platen, the rib or bar 38 of housed block causes the upper portion of the inker to be displaced downwardly against the resistance of the coiled spring 62 and as the keyboard progressively travels towards the platen, the inker ultimately will move under the casing of the keyboard (see Fig. 4), that is, the inker 60 practically disappears and is concealed within the casing.

As illustrated, in Fig. 4, the keyboard or casing has been displaced to such a position that small type 39 of bar 38 is against the platen, that is to say, in printing position. If therefore a sheet of paper were about the platen at this time, the desired printing impression would be effected. It will be noted, however, that as the keyboard is moved forwardly the angular relation of links 29 in respect to their cooperating long arms 27 of bell crank lever 25 has changed such that springs 31 are distended.

Pursuant to the printing of the selected symbol desired, the operator removes finger pressure from the housed block and subsequently, the keyboard will slide back to its non-printing position automatically due to the release of the energy previously stored upon in the springs 31 during the time the keyboard advanced towards the platen. With the keyboard retracted, inker 60 rises automatically so that its inking pad 59 is again before the type bar receiving opening 59' of the rear wall 58 of the housing, that is, the disappearing inker 60 is self righting due to the automatic action of coiled spring 62 which is appropriately connected to its hinged end and to a portion of the fixed bracket 61.

Following each printing operation, automatic means is provided for moving the platen laterally one step to the left. For this purpose, a well known "Force" type of escapement 64 is employed (see Fig. 6). Briefly stated, this escapement comprises a step by step advancing pawl 65 and a locking pawl 66. These pawls cooperate with rack 67 carried by the platen carriage 16.

More specifically, the casing of the stepped keyboard of the several embodiments herein described comprises a depending fixed post 68 (see Figs. 6 and 11) to which is attached an actuating link 69 having an elongated slot 70. When the keyboard is moved in the direction of the arrow, namely towards the platen, end 71 of slot 70 causes link 72 to swing about its pivot 73 and therefore link 74 moves forwardly, consequently the pivoted crank lever 75 is rocked displacing its short arm 76 outwardly, which action causes pawl 65 to advance over to the teeth of rack 67, a distance equivalent to the width of one tooth and in a direction to the right. Although, the advancing pawl has been actuated, locking pawl 66 is still in engagement with rack 67, holding the carriage still until the printing is effected. Immediately thereafter, the advancing pawl is operated by spring 77 causing the teeth of the advancing pawl to effectively displace the carriage a distance equivalent to one tooth and in a direction to the left. In similar fashion, the platen carrying carriage is displaced step by step after each printing operation. It will be noted that if the carriage is displaced by the advancing pawl, the locking pawl operates to interlock with the carriage but with the next successive teeth of the rack due to the action of the cantilever leaf spring 78.

With the present arrangement herein disclosed, it is possible to return the carriage quickly to the right after it has traveled step by step to the left pursuant to printing or spacing operations. The platen may be advanced one step to the left by manually moving the keyboard towards the platen although no printing block is arranged within the housing 52 to affect the required spacing between the characters to be printed. However, to return the platen carriage quickly, long arm or handle 79 of the pivoted bell crank lever 80 is manually moved in a direction towards the platen, thus causing its short arm 81 to abut lug 82 of link 74, and hence bell crank lever 75 is rocked, swinging its arm 76 outwardly. This action causes advancing pawl 65 to release from rack 67. However, as the handle 79 continues in its movement towards the platen the toe 83 of bell crank lever 75 strikes lug 83' of pawl 65 and the latter abuts lug 84 carried by an offset arm of the locking pawl 66 and the latter disengages from the rack. It is thus apparent, that both pawls 65 and 66 are now free of the rack and accordingly the platen carriage may be quickly and slidably moved to the right. Upon the manual release of handle 79, springs 77 and 78 urge their associated pawls to interlock with the rack.

Where it is desired to print capital letters, the carriage may be raised at its rear end so as to dispose the large type 40 before the inker and subsequently against the printing platen. For this purpose, two independent depressible shift key levers as 86 are provided, each of which have their intermediate portions 87 pivotally carried by the longitudinally disposed rod 88 sustained by the sides of the casing 20. Each key lever comprises a free terminal portion 89 disposed under an inwardly offset arm 90 of the long arm 27 of an associated bell crank lever 25. Each shift key lever 86 also includes a free manipulating disc or key 91. If either of the shift key levers be depressed, the free terminal portions 89 of each of the shift key levers is raised. Consequently offset arms 90 are raised. It follows, therefore that bell crank levers 25 will be rocked or pivoted about the shanks of respective bolts or set screws 26. If arms 27 are elevated, links 29 accordingly elevate the rear end of the stepped casing, such that the larger type 40 of a selected block is at the elevation of ink absorbent roller 59 of inker 60. In this position of the casing the latter is now manually moved towards the platen, the large type of the selected block will first be coated and subsequently displaced in the direction towards and against the platen as is well understood.

Pursuant to printing, the platen, of course is automatically advanced one step due to the operation of the escapement. With finger pressure removed from either of the shift keys, the tiltable casing, drops to a normal position, namely, to print small type of characters or symbols and subsequently automatically retracts. Stated in another way to print capital letters, the carriage is bodily tilted to assume an inclined position, the pins 22 protruding from the casing partially rotating in the guide slots 23, but upon the removal of finger pressure from a shift key, the rear end of the casing falls, causing links 29 to rock associated bell cranks 25 in an opposite direction until their larger arms 27 again seat on the abutment posts 28.

In the form according to Figs. 8 to 11 inclusive, a plurality of indicia and type carrying members may be simultaneously disconnected from the keyboard and a single member of the plurality selected for carrying out the printing operation. To this end, the horizontal walls of the stepped keyboard or casing 20 include a multiplicity of alined perforations as 94. Simultaneously these openings removably receive a group or set of depending studs 95 carried by an elongated unitary channel shaped element, generally designated 96 which comprises a U shaped frame 97 having upstanding spaced sides 98 and 99 having several pairs of alined perforations 100 each pair slidably guiding a horizontally disposed plunger 101 having a forward manipulating end projecting beyond the front side 98 and another rear end provided with type carrying means for example, a bar 102 having small type 103 and large type 104.

Attached to each plunger is a vertically disposed post 105 to which is secured a disc 106 having suitable indicia for identifying the type carried by an associated bar 102. A helicoidal spring 107 acting against a front wall of side 99 and against a post 105 normally maintains plunger 101 retracted, that is, so that its type bar is away from the cooperating platen.

A closure 108 in the form of an elongated plate is appropriately secured to the spaced sides 98, 99 of a respective channel and each closure comprises a plurality of transversely disposed slots 109, each of which reciprocably guide a post 105. In Fig. 10, type bar 102 is away from the platen 17. In this position, the stepped keyboard, of course, would be away from the platen and the plunger of selected bar is retracted. In carrying into effect a printing operation, a selected plunger is moved by finger pressure inwardly causing the displacement of a respective post 105 and the compression of an associated spring. Post 105, however, strikes the rear face of slot 109 and consequently carries the channeled element bodily towards the platen and since there is a direct connection between a selected channeled element 96 with the stepped keyboard by reason of the depending pins 95, the keyboard will be bodily displaced towards the platen, as in the case of the earlier embodiments disclosed in connection with Figs. 1–7 inclusive, that is, if a selected plunger of a panel or channel element 96 is actuated, the keyboard will be bodily displaced towards and against the platen and consequently the selected type bar casts an impression on the paper against the platen.

In Fig. 8, the indicia and type carrying member for the numeral "7" of a selected channeled element or panel 96 is disposed before the inker 59. This panel may be conveniently and quickly removed and reset relative to the horizontal wall of the upper step so that either of the other indicia and type carrying members thereof is centered or disposed before the inker 59 or alternatively, the channeled element with which the indicia and type carrying member "7" is identified may be removed from the upper step of the keyboard and quickly arranged in its normal section on the keyboard, for example, section generally designated 110, where all of its depending pins 95 enter openings 94 thereof, the ends of a channeled element being retained in its section by reason of upwardly disposed springs as 111 and 112 suitably struck out of the horizontal walls of the steps of the casing. In like manner, another channeled element having other indicia and type carrying members may be quickly removed from its section of the casing and selectively arranged in the upper step thereof for printing one or more of the characters identified thereby and pursuant to the printing operations replaced in its respective section as is well understood.

In the several modifications disclosed an elongated strip 114 simulating a spacing key or bar is immovably mounted on the casing. If desired the bar may be contacted by finger pressure on the part of the operator to bodily displace the keyboard towards the platen for any desired purpose.

With the form shown, for example, in Fig. 1, the keyboard includes a housing for disconnectably confining a selected indicia and type carrying member or block which is utilized to actuate the stepped keyboard. In the case of the embodiment illustrated in Figs. 8 to 11 inclusive, instead of utilizing a housing for the reception of a single indicia and type carrying member this housing is eliminated, and a bank or panel, such as, a channeled element 96 having a plurality of indicia and type carrying members is bodily and removably mounted on the upper step of the keyboard and the selected indicia and type carrying member is appropriately disposed before the swingable inker after which the selected indicia and type carrying member of the panel is actuated to bodily move the keyboard. With either of the modifications herein specifically disclosed, the keyboard after the printing operation automatically retracts, the keyboard may be selectively and bodily tilted to print capital letters by depressing a shift key lever, and the carriage may be quickly restored to the right by actuating the conveniently accessible manipulating arm 79 of a bell crank lever 80 to free the locking and advancing pawl of the platen carriage.

From the foregoing description considered in connection with the accompanying drawings, it is believed that several novel structural features of my present improvement as well as the advantages thereof will be readily appreciated. Because of the simple form of the various elements entering into the disclosed construction, the typewriter of the character herein specifically disclosed may be produced at comparatively small manufacturing cost.

The herein described and illustrated embodiments have given satisfactory results and it will be obvious to those skilled in the art, after an understanding of my invention, that other changes and modifications may be made without departing from the spirit and scope of the invention and it is intended that all matter contained in the above description or shown in the accompanying drawings shall be interpreted as illustrative and not in a limiting sense.

I claim:

1. In a toy typewriter, the combination of, a platen, a keyboard bodily shiftable towards and away from said platen, and indicia and type carrying means removably mounted on said keyboard.

2. In a toy typewriter, the combination of, a platen, a keyboard movable towards and away from said platen, inking means interposed between said platen and keyboard, indicia and type carrying means removably mounted on said keyboard and adapted to actuate the latter to position the type of said carrying means initially against said inking means and subsequently against said platen.

3. In a toy typewriter, the combination of, a platen, a keyboard movable towards and away from said platen, inking means, a member removably mounted on said keyboard and having type means, said member cooperating with said keyboard to shift the latter for disposing said type means to contact said inking means and displace the latter out of the path of travel of said keyboard and to permit the coated type of said member to be directed against said platen.

4. In a toy typewriter, the combination of, a platen, a reciprocable keyboard having a plurality of indicia and type carrying members each removably mounted thereon, said keyboard being manually displaceable towards said platen for positioning the type of one of said members thereagainst and means for automatically retracting said keyboard.

5. In a toy typewriter, the combination of, a platen, reciprocable keyboard means having type carrying means disconnectably mounted thereon, means for laterally shifting said platen after each stroke of said keyboard means towards the platen and automatic means for retracting said keyboard.

6. In a toy typewriter, the combination of, a platen, a keyboard bodily shiftable towards said platen and having removable type carrying means provided with upper and lower type, swingable inking means actuated by said carrying means for coating either the upper or lower type thereof, said keyboard having means for removably and bodily guiding said coated type against said platen, and means for automatically retracting said keyboard.

7. In a toy typewriter, the combination of, a platen, self righting inking means disposed in front of said platen, reciprocable keyboard means comprising a plurality of identified type carrying means removably mounted thereon, said keyboard in its movement towards said platen serving to displace said inking means out of the path of travel thereof, escapement means for advancing said platen step by step, and means for automatically retracting said keyboard means.

8. In a toy typewriter, the combination of, a platen, a keyboard movable towards and away from said platen, type carrying means removably mounted on said keyboard, shiftable inking means interposed between said platen and keyboard, said type carrying means comprising upper and lower spaced type, said keyboard having guide means to receive said type carrying means for normally positioning the upper type thereof in line with said inking means to contact and displace the latter during the movement of said keyboard towards said platen, said keyboard bodily carrying the previously contacted type against said platen.

9. In a typewriter, the combination of, a displaceable keyboard having type carrying means removably mounted thereon, a platen, swingable inking means interposed between said platen and keyboard, said carrying means comprising upper and lower spaced type, and means for tilting said keyboard to position said lower type in line with said inking means.

10. In a toy typewriter, the combination of, a platen, a reciprocable keyboard having a plurality of independently removable type blocks mounted thereon, each block having upper and lower spaced type, a self righting inker intermediate said keyboard and platen, means carried by said keyboard for removably receiving a selected block of said plurality to arrange the upper type thereof in the path of said inker, said selected block upon the application of pressure thereon being adapted to bodily displace said keyboard, said upper type of said selected block contacting said inker and displacing the latter, said selected block upon continued pressure thereon correspondingly continuing the displacement of said keyboard towards said platen and carrying the previously contacted upper type thereagainst.

11. In a typewriter, the combination of, a platen, a reciprocable and tiltable keyboard having a plurality of independently removable blocks mounted thereon, each block having upper and lower spaced type, a self righting swingable inker intermediate said keyboard and platen, retaining means carried by said keyboard for removably holding a selected block of said plurality, means for tilting said keyboard to raise one end thereof to position the lower type of said selected block in line with said inker, said selected block cooperating upon the application of pressure thereon to displace said keyboard towards said inker for coating said lower type thereof, said selected block upon continued pressure thereon continuing the displacement of said keyboard towards said platen to position said previously coated type thereagainst.

12. In a toy typewriter, the combination of, a platen, a reciprocable self retracting casing, a swingable self righting inker interposed between said platen and casing, a plurality of panels each removably mounted on said casing, each of said panels comprising a plurality of indicia identified type carrying means, said casing having means to removably support a selected indicia identified type carrying means of a selected panel in line with said inker, each of said type carrying means having a manipulating portion for moving said selected type carrying means against said inker and driving means actuated by said portion for bodily moving said casing towards said platen to arrange said selected type carrying means thereagainst.

13. In a toy typewriter, the combination of, a platen, a reciprocable self retracting keyboard, a self positioning inker interposed between said platen and keyboard, a plurality of panels each removably mounted on said keyboard, each of said panels having a plurality of self retracting indicia identified type carrying means, said keyboard having means for removably positioning a selected indicia identified type carrying means of a selected panel in line with said inker, each of said type carrying means having upper and lower type, selective means for elevating one end of said keyboard to raise the lower type of said selected type carrying means in respect to said inker, each of said type carrying means having a manipulating portion, said manipulating portion of a selected type carrying means being displaceable for moving said lower type thereof against said inker and subsequently remove the latter out of the path of travel of said keyboard, driving means associated with each manipulating portion for bodily moving said keyboard towards said platen for arranging the lower type of a selected type carrying means against said platen.

14. In combination, a step by step laterally displaceable platen, a reciprocable and tiltable keyboard having type carrying means removably mounted thereon, and inker means disposed in the path of travel of said keyboard and displaceable out of said path thereby.

15. In combination, a step by step laterally displaceable platen, a reciprocable and tiltable keyboard having a plurality of steps, a plurality type carrying blocks removably mounted on said steps, said keyboard having guide means for removably receiving a selected block of said plurality of blocks to permit the type thereof to overhang said keyboard, inking means for coating said last mentioned type, said keyboard being slidably guided in its movement towards said platen for positioning said coated type thereagainst.

16. In combination, a step by step laterally displaceable platen, a reciprocable and tiltable keyboard having a plurality of steps, a plurality of type carrying blocks removably mounted on several of said steps, said keyboard having guide means for removably receiving a selected block of said plurality of blocks, each block having upper and lower type, an inker for coating either the upper or lower type of said selected block, said upper type of a selected block being normally in line with said inker, means for tilting said keyboard to raise said lower type of a selected block relative to said inker, said keyboard being bodily movable upon the application of pressure on said selected block towards said platen to initially coat the lower type of said selected block and displace said inker and subsequently direct said coated type against the platen.

17. In a toy typewriter, the combination of, a platen, a stepped keyboard bodily shiftable towards and away from said platen, and an indicia and type carrying block removably sustained on said keyboard.

18. As a new article of manufacture, a block having a vertical wall carrying type means, a post secured to the upper portion of said block, type identifying means carried by said post, and a pin depending from said block.

19. In a toy typewriter, the combination of, a keyboard, a plurality of indicia and type carrying block means each removably sustained on said keyboard and each including a depending pin, and spring means associated with each block means and cooperating to disconnectably interlock with the companion depending pin of the latter.

20. In a toy typewriter, the combination of, a bodily shiftable keyboard having a plurality of steps, a plurality of indicia and type carrying blocks each removably sustained on a step of said keyboard, each of said blocks having a depending pin, and a spring adapted to removably interlock with the latter.

21. In a toy typewriter, the combination of, a keyboard having a plurality of steps, separately removable indicia identified and type carrying blocks mounted on each of said steps, each of said blocks having a depending pin, and a spring cooperating to disconnectably interlock with the latter.

HARRY BATES.